US010523635B2

(12) United States Patent
Wright et al.

(10) Patent No.: US 10,523,635 B2
(45) Date of Patent: Dec. 31, 2019

(54) FILTERING OUTBOUND NETWORK TRAFFIC

(71) Applicant: Assured Information Security, Inc., Rome, NY (US)

(72) Inventors: Jared Wright, Aurora, CO (US); Jacob Torrey, Elizabeth, CO (US)

(73) Assignee: ASSURED INFORMATION SECURITY, INC., Rome, NY (US)

( * ) Notice: Subject to any disclaimer, the term of this patent is extended or adjusted under 35 U.S.C. 154(b) by 207 days.

(21) Appl. No.: 15/185,229

(22) Filed: Jun. 17, 2016

(65) Prior Publication Data

US 2017/0366505 A1   Dec. 21, 2017

(51) Int. Cl.
 *H04L 29/06* (2006.01)
 *H04L 29/08* (2006.01)
 *H04L 12/813* (2013.01)
 *H04L 12/801* (2013.01)

(52) U.S. Cl.
 CPC ........ *H04L 63/0263* (2013.01); *H04L 47/196* (2013.01); *H04L 47/20* (2013.01); *H04L 63/102* (2013.01); *H04L 67/306* (2013.01); *H04L 63/0236* (2013.01); *H04L 63/104* (2013.01)

(58) Field of Classification Search
 CPC ............. H04L 63/0254; H04L 63/0263; H04L 47/196; H04L 47/20; H04L 67/306; H04L 63/0227; H04L 63/20
 USPC ...................................................... 726/13, 1
 See application file for complete search history.

(56) References Cited

U.S. PATENT DOCUMENTS

| | | | | | |
|---|---|---|---|---|---|
| 5,983,270 | A | * | 11/1999 | Abraham | H04L 29/06 709/224 |
| 6,463,474 | B1 | * | 10/2002 | Fuh | H04L 63/0227 709/225 |
| 6,611,869 | B1 | * | 8/2003 | Eschelbeck | H04L 41/0213 707/999.009 |
| 6,892,245 | B1 | * | 5/2005 | Crump | H04L 29/12066 709/223 |
| 7,389,354 | B1 | * | 6/2008 | Sitaraman | H04L 63/1458 709/229 |
| 7,475,424 | B2 | * | 1/2009 | Lingafelt | H04L 63/0227 726/1 |

(Continued)

OTHER PUBLICATIONS

Xie, Yinglian, Fang Yu, and Martin Abadi. "De-anonymizing the internet using unreliable IDs." In ACM SIGCOMM Computer Communication Review, vol. 39, No. 4, pp. 75-86. ACM, 2009. (Year: 2009).*

(Continued)

*Primary Examiner* — Luu T Pham
*Assistant Examiner* — Walter J Malinowski
(74) *Attorney, Agent, or Firm* — Matthew M. Hulihan; Heslin Rothenberg Farley & Mesiti PC (57) ABSTRACT

Obtaining, in association with origination of outbound network traffic to be sent by a system, user account information of a user account on behalf of which the outbound network traffic is generated, and performing filtering of the outbound network traffic based on the obtained user account information of the user account on behalf of which the outbound network traffic is generated, where the filtering is further based on one or more rules, and the filtering includes determining whether to block or allow sending of the outbound network traffic from the system.

18 Claims, 4 Drawing Sheets

(56) References Cited

U.S. PATENT DOCUMENTS

| | | | | |
|---|---|---|---|---|
| 7,587,499 B1* | 9/2009 | Haghpassand | | G06F 21/50 370/229 |
| 7,877,796 B2* | 1/2011 | Smith | | H04L 12/56 370/230 |
| 8,019,689 B1* | 9/2011 | Nachenberg | | G06Q 10/063 705/50 |
| 8,151,323 B2* | 4/2012 | Harris | | H04L 67/06 726/4 |
| 8,239,445 B1* | 8/2012 | Gage | | H04L 29/06 709/203 |
| 8,443,429 B1* | 5/2013 | Johnson, Sr. | | H04L 67/306 726/1 |
| 8,495,181 B2* | 7/2013 | Venkatraman | | H04L 63/0227 709/202 |
| 8,875,073 B1* | 10/2014 | Sundararajan | | G06F 17/505 716/104 |
| 9,117,090 B2* | 8/2015 | Kennedy | | G06F 21/6236 |
| 9,231,962 B1* | 1/2016 | Yen | | H04L 63/1408 |
| 9,300,625 B1* | 3/2016 | Potlapally | | H04L 63/04 |
| 9,300,629 B1* | 3/2016 | Jahr | | H04L 63/02 |
| 9,336,386 B1* | 5/2016 | Qu | | G06F 21/55 |
| 9,426,178 B1* | 8/2016 | Yanovsky | | H04L 63/20 |
| 9,537,894 B1* | 1/2017 | Kuscher | | H04L 63/20 |
| 9,641,544 B1* | 5/2017 | Treat | | H04L 63/1425 |
| 2001/0056550 A1* | 12/2001 | Lee | | H04L 63/083 726/11 |
| 2003/0054881 A1* | 3/2003 | Hedrick | | G07F 17/0014 463/29 |
| 2003/0184251 A1* | 10/2003 | Oyama | | G05B 13/042 318/607 |
| 2003/0216958 A1* | 11/2003 | Register | | G06Q 30/02 705/14.61 |
| 2003/0224760 A1* | 12/2003 | Day | | H04L 29/06 455/412.1 |
| 2004/0030424 A1* | 2/2004 | Corl, Jr. | | H04L 63/0236 700/90 |
| 2004/0042470 A1* | 3/2004 | Cooper | | H04L 41/046 370/401 |
| 2004/0123150 A1* | 6/2004 | Wright | | G06F 21/32 726/1 |
| 2004/0203581 A1* | 10/2004 | Sharon | | G06Q 30/02 455/406 |
| 2004/0215931 A1* | 10/2004 | Ellis | | A01N 25/30 712/36 |
| 2004/0268151 A1* | 12/2004 | Matsuda | | G06F 21/6218 726/11 |
| 2005/0097143 A1* | 5/2005 | Pudipeddi | | G06F 8/656 |
| 2005/0193086 A1* | 9/2005 | Sieben | | H04L 29/06 709/217 |
| 2005/0240993 A1* | 10/2005 | Treadwell | | G06F 21/55 726/13 |
| 2005/0283615 A1* | 12/2005 | Chakravarthi | | H04L 63/101 713/182 |
| 2006/0045131 A1* | 3/2006 | Pancholi | | H04L 69/166 370/472 |
| 2006/0075478 A1* | 4/2006 | Hyndman | | H04L 63/0218 726/11 |
| 2006/0140200 A1* | 6/2006 | Black | | H04L 29/06027 370/401 |
| 2006/0168264 A1* | 7/2006 | Baba | | H04L 12/2809 709/230 |
| 2007/0005801 A1* | 1/2007 | Kumar | | H04L 63/08 709/238 |
| 2007/0016945 A1* | 1/2007 | Bassett | | H04L 63/0263 726/11 |
| 2007/0112955 A1* | 5/2007 | Clemm | | H04L 43/0817 709/224 |
| 2007/0220154 A1* | 9/2007 | El Husseini | | H04L 63/0281 709/227 |
| 2007/0237159 A1* | 10/2007 | Yamada | | H04L 12/2834 370/395.53 |
| 2007/0248084 A1* | 10/2007 | Whitehead | | H04L 63/1466 370/389 |
| 2008/0046993 A1* | 2/2008 | Mullick | | H04L 63/0272 726/15 |
| 2008/0168545 A1* | 7/2008 | Inoue | | G06F 21/41 726/6 |
| 2008/0178278 A1* | 7/2008 | Grinstein | | H04L 63/0227 726/12 |
| 2008/0186978 A1* | 8/2008 | Geib | | H04L 45/00 370/395.31 |
| 2008/0250478 A1* | 10/2008 | Miller | | H04L 9/32 726/5 |
| 2008/0301794 A1* | 12/2008 | Lee | | H04L 63/0281 726/11 |
| 2009/0024663 A1* | 1/2009 | McGovern | | G06F 21/577 |
| 2009/0037546 A1* | 2/2009 | Kirsch | | G06Q 10/107 709/206 |
| 2009/0037583 A1* | 2/2009 | Alessandri | | H04L 29/12367 709/225 |
| 2009/0077033 A1* | 3/2009 | McGary | | G06F 16/24578 |
| 2009/0089870 A1* | 4/2009 | Wahl | | H04L 63/0823 726/9 |
| 2009/0120001 A1* | 5/2009 | Sugiura | | E05F 15/70 49/324 |
| 2009/0124241 A1* | 5/2009 | Krishnaswamy | | G06Q 30/02 455/414.2 |
| 2009/0132090 A1* | 5/2009 | Kaczmarz | | F25D 29/008 700/275 |
| 2009/0157650 A1* | 6/2009 | Chow | | G06F 17/30893 |
| 2009/0271866 A1* | 10/2009 | Liske | | G06F 21/53 726/23 |
| 2010/0040085 A1* | 2/2010 | Olderdissen | | H04L 43/50 370/474 |
| 2010/0052901 A1* | 3/2010 | Szucs | | H04L 12/2809 340/540 |
| 2010/0332615 A1* | 12/2010 | Short | | H04L 63/08 709/217 |
| 2011/0154481 A1* | 6/2011 | Kilgore | | G06F 21/31 726/19 |
| 2011/0173688 A1* | 7/2011 | Nanaumi | | G06F 21/31 726/8 |
| 2011/0185166 A1* | 7/2011 | Iyer | | G06F 21/604 713/100 |
| 2011/0277034 A1* | 11/2011 | Hanson | | G06F 21/554 726/25 |
| 2012/0005743 A1* | 1/2012 | Kitazawa | | H04L 63/1425 726/13 |
| 2012/0030750 A1* | 2/2012 | Bhargava | | H04L 63/02 726/13 |
| 2012/0144057 A1* | 6/2012 | Meredith | | H04L 63/0263 709/232 |
| 2012/0192258 A1* | 7/2012 | Spencer | | H04W 12/06 726/7 |
| 2012/0198541 A1* | 8/2012 | Reeves | | H04L 63/0227 726/13 |
| 2012/0203880 A1* | 8/2012 | Kluyt | | G06F 9/54 709/223 |
| 2012/0284349 A1* | 11/2012 | Robinson | | H04L 51/043 709/206 |
| 2013/0047210 A1* | 2/2013 | Rotman | | G06F 21/31 726/3 |
| 2013/0060863 A1* | 3/2013 | D'Eri | | G06F 17/274 709/206 |
| 2013/0097652 A1* | 4/2013 | Bhattacharjee | | G06F 21/566 726/1 |
| 2013/0132545 A1* | 5/2013 | Schultze | | H04L 41/00 709/223 |
| 2013/0160013 A1* | 6/2013 | Pires | | G06F 21/41 718/1 |
| 2013/0160115 A1* | 6/2013 | Venkataramanappa | | G06F 11/3409 726/22 |
| 2013/0191631 A1* | 7/2013 | Ylonen | | H04L 63/1483 713/153 |
| 2013/0298219 A1* | 11/2013 | Byrkit | | H04L 63/1416 726/12 |

(56) References Cited

U.S. PATENT DOCUMENTS

| | | | | |
|---|---|---|---|---|
| 2013/0318339 | A1* | 11/2013 | Tola | H04L 63/0478 713/150 |
| 2013/0322266 | A1* | 12/2013 | Maon | H04L 41/14 370/252 |
| 2014/0013409 | A1* | 1/2014 | Halageri | H04L 63/0815 726/8 |
| 2014/0075540 | A1* | 3/2014 | Kudla | H04L 63/0263 726/13 |
| 2014/0094142 | A1* | 4/2014 | Torres | H04W 76/15 455/411 |
| 2014/0245389 | A1* | 8/2014 | Oberheide | H04L 63/0884 726/3 |
| 2014/0304765 | A1* | 10/2014 | Nakamoto | H04L 63/20 726/1 |
| 2015/0143453 | A1* | 5/2015 | Erb | H04L 63/102 726/1 |
| 2015/0150141 | A1* | 5/2015 | Szymanski | G06Q 30/0635 726/26 |
| 2015/0180993 | A1* | 6/2015 | Yamada | G06F 16/951 709/223 |
| 2015/0304278 | A1* | 10/2015 | Johnson | H04L 63/02 726/11 |
| 2016/0014138 | A1* | 1/2016 | Shapiro | H04L 63/104 726/4 |
| 2016/0057626 | A1* | 2/2016 | O'Toole | H04L 63/08 726/4 |
| 2016/0078581 | A1* | 3/2016 | Maher | G06Q 50/265 705/325 |
| 2016/0092551 | A1* | 3/2016 | Tang | G06F 16/9535 707/740 |
| 2016/0119367 | A1* | 4/2016 | Li | H04L 12/6418 726/1 |
| 2016/0277400 | A1* | 9/2016 | Maurya | H04L 63/0807 |
| 2016/0344715 | A1* | 11/2016 | Kumar | H04L 63/123 |
| 2016/0344754 | A1* | 11/2016 | Rayapeta | H04L 63/1416 |
| 2016/0373270 | A1* | 12/2016 | Yang | H04W 12/06 |
| 2017/0060856 | A1* | 3/2017 | Turtle | G06F 17/30 |
| 2017/0124809 | A1* | 5/2017 | Elias | G07F 17/32 |
| 2017/0140660 | A1* | 5/2017 | Morton | G09B 9/00 |
| 2017/0142067 | A9* | 5/2017 | Pietrowicz | H04L 63/0254 |
| 2017/0206273 | A1* | 7/2017 | Tannenbaum | G06F 16/61 |
| 2017/0251003 | A1* | 8/2017 | Rostami-Hesarsorkh | H04L 63/1425 |
| 2017/0366505 | A1* | 12/2017 | Wright | H04L 67/306 |

OTHER PUBLICATIONS

EMC® Smarts®, Network Configuration Manager Compliance Advisor, Version 9.2, Mar. 2013, 164 pages. (Year: 2013).*

JunHua, He, and Cao Yuan. "Research and analysis the PPPoE server technology based on the Routeros." In Computer Application and System Modeling (ICCASM), 2010 International Conference on, vol. 15, pp. V15-209. IEEE, 2010. (Year: 2010).*

Borders, Kevin, and Atul Prakash. "Web tap: detecting covert web traffic." In Proceedings of the 11th ACM conference on Computer and communications security, pp. 110-120. ACM, 2004. (Year: 2004).*

Limthong, Kriangkrai, Pirawat Watanapongse, and Fukuda Kensuke. "A wavelet-based anomaly detection for outbound network traffic." In 8th Asia-Pacific Symposium on Information and Telecommunication Technologies, pp. 1-6. IEEE, 2010. (Year: 2010).*

Windows Driver Kit, accessed May 3, 2016, https://msdn.microsoft.com/en-us/library/windows/hardware/ff557573(v=vs.85).aspx, 2 pages.

Windows Filtering Platform, accessed May 3, 2016, https://msdn.microsoft.com/en-us/library/windows/desktop/aa366510(v=vs.85).aspx, 2 pages.

About Windows Filtering Platform, accessed May 3, 2016, https://msdn.microsoft.com/en-us/library/windows/desktop/aa363967(v=vs.85).aspx, 4 pages.

\* cited by examiner

FILTERING OUTBOUND NETWORK TRAFFIC

BACKGROUND

In a computer network environment, allowing outside access to an internal network component creates a potential risk for the outside access to pivot to another internal component. As an example, many Information Technology (IT) organizations allow external software vendors to access the organization's internal networks, for instance for the purpose of installing updates to the vendor's software products. However, once a vendor has been given access to a single server, the vendor may be able to use that access to as a pivot point into other components of the internal network.

BRIEF SUMMARY

Shortcomings of the prior art are overcome and additional advantages are provided through the provision of a method that includes obtaining, in association with origination of outbound network traffic to be sent by a system, user account information of a user account on behalf of which the outbound network traffic is generated; and performing filtering of the outbound network traffic based on the obtained user account information of the user account on behalf of which the outbound network traffic is generated, wherein the filtering is further based on one or more rules, and the filtering comprises determining whether to block or allow sending of the outbound network traffic from the system.

Further, a computer program product is provided including a non-transitory computer-readable storage medium including program instructions for execution to perform a method that includes obtaining, in association with origination of outbound network traffic to be sent by a system, user account information of a user account on behalf of which the outbound network traffic is generated; and performing filtering of the outbound network traffic based on the obtained user account information of the user account on behalf of which the outbound network traffic is generated, wherein the filtering is further based on one or more rules, and the filtering comprises determining whether to block or allow sending of the outbound network traffic from the system.

Yet further, a computer system is provided that is configured to perform a method that includes obtaining, in association with origination of outbound network traffic to be sent by a system, user account information of a user account on behalf of which the outbound network traffic is generated; and performing filtering of the outbound network traffic based on the obtained user account information of the user account on behalf of which the outbound network traffic is generated, wherein the filtering is further based on one or more rules, and the filtering comprises determining whether to block or allow sending of the outbound network traffic from the system.

Additional features and advantages are realized through the concepts of aspects of the present invention. Other embodiments and aspects of the invention are described in detail herein and are considered a part of the claimed invention.

BRIEF DESCRIPTION OF THE DRAWINGS

Aspects of the present invention are particularly pointed out and distinctly claimed as examples in the claims at the conclusion of the specification. The foregoing and other objects, features, and advantages of aspects of the invention are apparent from the following detailed description taken in conjunction with the accompanying drawings in which:

DETAILED DESCRIPTION

In an effort to protect against unauthorized access to network components, system administrators can utilize a built-in firewall, such as the Windows® Firewall With Advanced Security (offered by Microsoft Corporation, Seattle, Wash., U.S.A.; Windows is a registered trademark of Microsoft Corporation), to restrict the an outsider's, e.g. a vendor's, access to other servers. However, the ability to filter outbound network traffic based on user is unsupported. The restriction is in some ways counter to the assumption that giving a user access to a given component should grant permission to access anything that that component can access.

Aspects described herein present a containment system networking utility, referred to interchangeably herein as a containment system or VCS, designed to confine users to a single server within an internal network. Confining users refers at least in part to confining network traffic and activity of the users. The containment system inspects and blocks/filters outgoing network connections and traffic based on user attribute(s), such as username, authentication domain for the user, and/or user group (guests, Administrators, or user-defined group as examples). This functionality enables filtering to be tailored on a per-user, user group, and/or per-domain basis.

Figure 1:
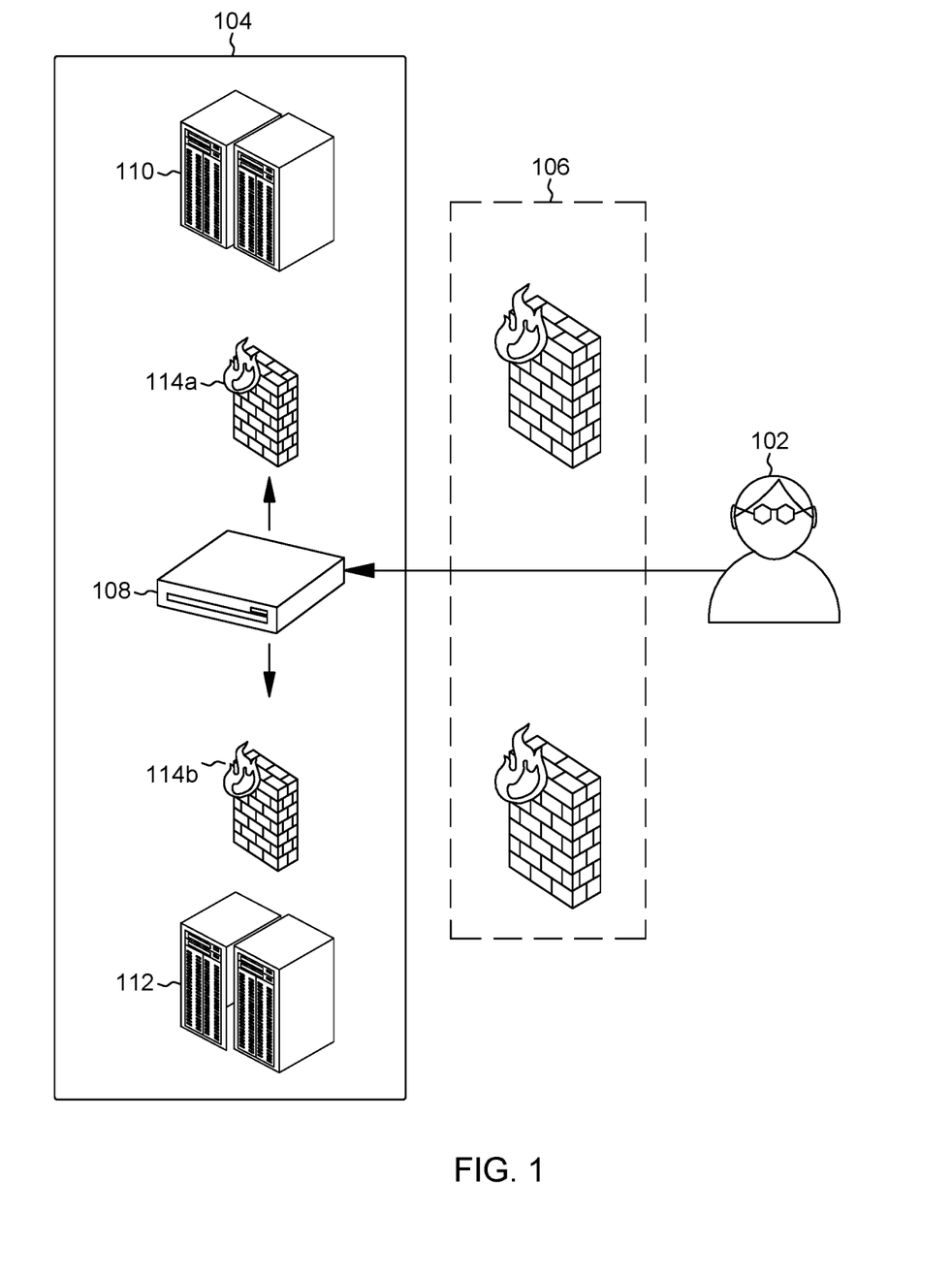
FIG. 1 depicts an example of external access to an internal network.

Referring to FIG. 1, which depicts an example of external access to an internal network, a vendor 102 using a client system external to the internal network 104 accesses the internal network 104 through a firewall 106. The internal network includes several components. Initially, the vendor 102 accesses router 108. Aspects described herein can be used to prevent a pivot of the vendor's access from, for instance, router 108 to other components, such as first compute cluster 110 and second computer cluster 112, which sit behind first and second firewalls 114a and 114b, respectively. In this example, the vendor may be responsible for upgrading the firmware of router 108. As another example, vendor 102 is given access to first cluster 104 through router 108 and firewall 114a, but should not be allowed to pivot to access second cluster 112.

Aspects described herein are presented by way of example and not limitation with reference to the Windows® line of software offerings offered by Microsoft Corporation. However, aspects described herein are applicable to other operating systems (OSs) and software offerings, such as the Unix and Linux environments.

The authentication domain in the Windows® environment refers to the Active Directory® (Active Directory is a registered trademark of Microsoft Corporation). In Linux and other environments, the authentication domain can be built on the Lightweight Directory Access Protocol (LDAP), which is not vendor specific. When authentication domain-based filtering is applied in accordance with aspects described herein, the filtering can, for instance, block network traffic generated on behalf of some or all users who login by logging onto an authentication domain managed by, e.g., Windows® server Active Directory®. In a scenario that filters all users of a specific domain, then all users who log into the server on the specific domain are prevented from, e.g., opening new network connections and/or sending particular types of outbound network traffic.

The containment system described herein adds firewall capabilities that are not otherwise supported by built-in operating system firewalls. In some examples, an operating system networking driver facilitates creation of outbound firewall rules on a per-user, user-group, and/or authentication domain basis. Support for outbound firewall rules can help isolate users, e.g. vendors, to a single scope within a network. An example scope refers to a server, component, machine, software, etc. corresponding to different addresses and/or ports, as examples.

The vendor example is just one example; aspects described herein can be used to prevent internal users from shifting around to other internal scopes.

Example implementations of a containment system in accordance with aspects described herein are now described in further detail using a Windows® environment by way of example only. The containment system is made up of two primary software components: a Windows® driver and a command line interface, both of which may be implemented in any appropriate programming language, such C. The containment system may be built using an integrated development environment, such as Visual Studio® (offered by Microsoft Corporation) and Windows® Driver Kit (WDK) 8 (also offered by Microsoft Corporation). The IDE may have additional project directories for common components, a Windows® Installer, and a driver package project.

Figure 2:
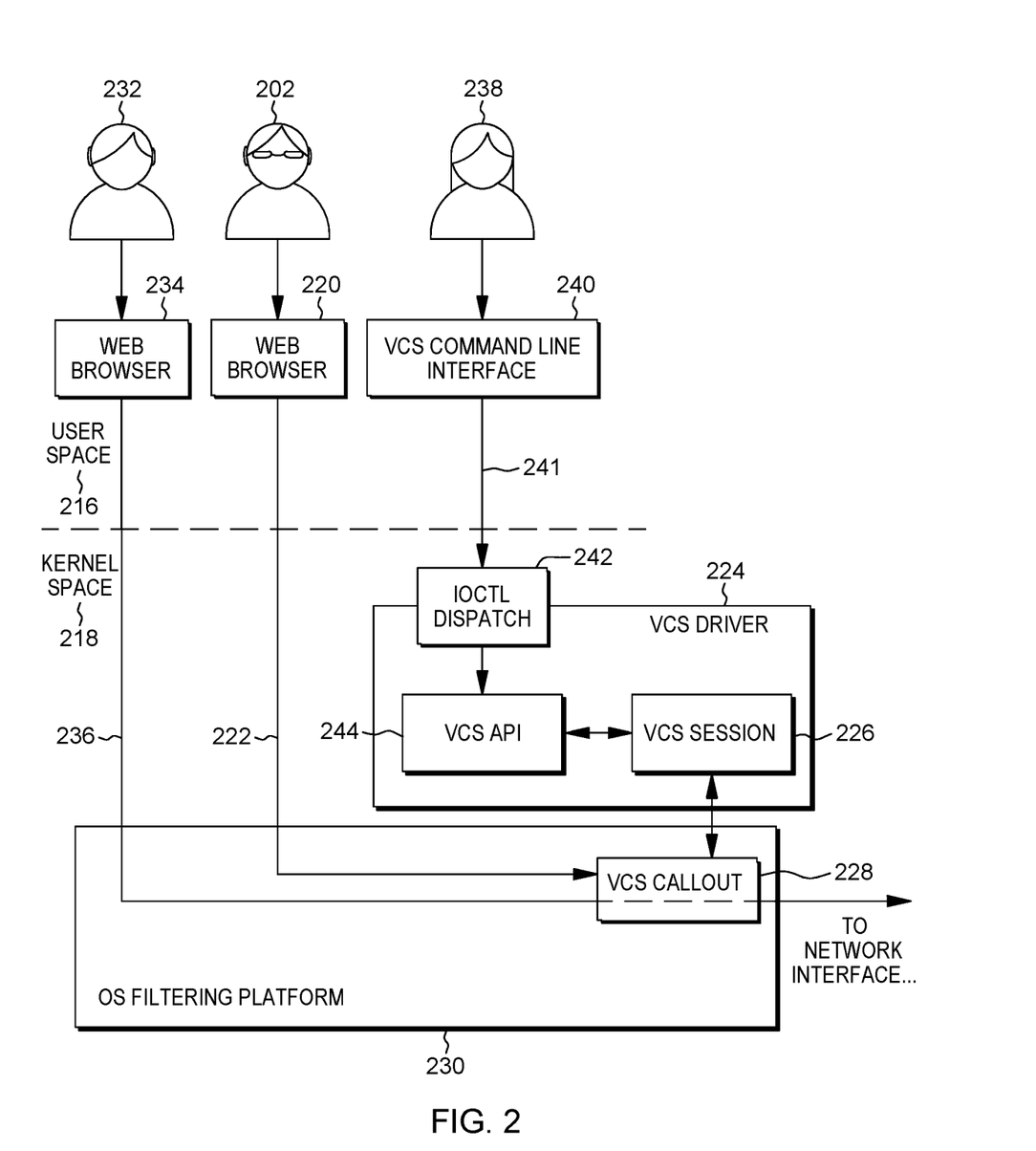
FIG. 2 illustrates an example of filtering outbound network traffic in accordance with aspects described herein.

FIG. 2 illustrates an example of filtering of outbound network traffic in accordance with aspects described herein. FIG. 2 depicts a vendor 202 attempting to send outbound traffic 222 that is not permitted based on the active filtering rule(s). The containment system blocks the traffic from exiting to the network interface and/or network. Vendor 202 and other user 232 are shown utilizing web browsers 220 and 234, respectively, executing in user space 216. Outbound network traffic is to be generated and sent on behalf of the user accounts of these users. The traffic, as 222 and 236, is passed to kernel space 218 and enters an operating system filtering platform 230. A containment system callout, VCS callout 228, blocks the outbound traffic generated on behalf of vendor 202 and allows outbound traffic generated on behalf of other user 232.

In this example, the VCS callout 228 is depicted as part of the OS filtering platform 230, however it may be considered part of the VCS driver. The VCS driver 224 may be responsible for setting up an object call with the VCS callout 228 to register its integration with the Windows® firewall. In any case, the VCS callout 228 may be distributed as part of the driver package in which the VCS driver 224 is distributed.

Further details are now provided for additional components presented in FIG. 2.

VCS Driver:

The VCS driver 224 may be built on top of the Windows® Filtering Platform, a system-level application programming interface (API) that places hooks into the Windows® Transmission Control Protocol (TCP)/Internet Protocol (IP) networking stack. This may be the system level API utilized by the Windows® Firewall With Advanced Security, and may allow the driver to analyze and manipulate network traffic from within the Windows® kernel. In this manner, the VCS driver 224 includes a hook procedure for handling a hook installed into a networking stack of the system via the system level application programming interface.

By way of a specific example and not limitation, the VCS driver 224 can be implemented as following components, with reference to their source ".c" files:

VCSDriver.c (see 224 of FIG. 20—This is responsible for setting up hooks and metadata, and installing and starting the driver. This component may be compiled into one driver package (e.g. a .sys file) for deploying the driver.

This is responsible for loading and unloading the VCS driver (e.g. 224 of FIG. 2) from the Windows® kernel and also for initializing other components in the VCS driver. It can contain well-defined Windows® DriverEntry and DriverUnload routines in addition to desired support functions to facilitate working with the Windows® Filtering Platform.

IoctlDispatch.c (see 242 of FIG. 2)—This component is responsible for decoding input/output control (IOCTL) messages received by the VCS driver from the VCS command line interface 240, and then routing the messages to the appropriate handler function, for instance in VCSApi.c (see below). This component provides the VCS driver's defined codes to trigger interrupts between user space and the OS kernel. An example such defined code is the IRP_MJ_DEVICE_CONTROL function, which the OS can use to call out to the driver.

VCSApi.c (see 244 of FIG. 2)—This component defines the API available to call and manipulate from user-space. This allows a userspace application (such as the VCS command line interface 240, described in further detail below) to perform various tasks, such as adding new filters, deleting filters, turning debug messages off/on, and enabling/disabling the VCS filters, as examples.

VCSSession.c—This component holds data structures that represent the driver's state during runtime. The VCS session 226 can, in some examples, be regarded as a wrapper around data structures that represent VCS filters. Other components in the driver may, in some examples, not manipulate these data structures directly but instead cause their manipulation through public functions defined in a VCS session header file. The VCS session 226 can synchronize read/write access to the driver's data structures from other components. The following list provides example data structures managed by the VCS session 226, referred to using specific names by way of example only, and not limitation:

uname_list—A linked list of vcs_filter_t structures that represent a key (e.g. string value) for usernames corresponding to user accounts that have been configured in VCS for filtering. Each vcs_filter_t structure can also contain a list of endpoint_t structures that represent a remote endpoint (such as IP address/port combination) configured for that key. In some examples, the driver interprets a particular value, such as 0, for the IP and/or port on an endpoint to mean "all". In other words, an endpoint indicated with IP=0 and port=0 is interpreted by the driver as 'all IP addresses on all ports'. Accordingly, each user against which outgoing traffic filtering (i.e. filtering against network traffic generated on behalf of that user) is to be applied may have a corresponding vcs_filter_t_structure that includes a list of endpoint_t structures that each correspond to a particular rule/filter applicable to that user. However, it should be immediately understood that this is just one way to implement the applicable filters in association with the users. Therefore, a respective structure may be maintained for each user account for which the filtering has been configured, where the structure for a user account includes a list of endpoint structures that each represent a respective remote endpoint for which network traffic filtering has been configured for that user account.

domain_list—This is a linked list of vcs_filter_t structures that represent a key (string value) for authentication domain(s) that have been configured in VCS. This list may be analogous to the uname_list above except that "key" of the vcs_filter_t corresponds to a particular authentication domain, rather than a username. Accordingly, a respective structure for each authentication domain that user account(s) for which the filtering has been configured logs onto for authenticating with the system may be maintained, where such a structure for an authentication domain includes a list of endpoint structures that each represent a respective remote endpoint for which network traffic filtering has been configured for that authentication domain.

filter_cache—In some examples, this is implemented as a circular buffer and holds the most recently read/modified vcs_filter_t data structures (size may be defined as a macro, such as FILTER_CACHE_SIZE). The filter_cache data structure can be implemented to speed-up lookup times for vcs_filter_t structures, which can provide benefits in environments where several filters have been configured. Thus, the filter cache buffer can store most recently accessed structure(s) corresponding to remote endpoints for which network traffic filtering has been configured, to increase filtering speed.

Continuing with details of the VCS driver components, the VCSCallout.c (see 228 of FIG. 2) can perform the actual inspection of network traffic on the outbound path of the Windows® TCP/IP networking stack. The VCS callout may be a Windows® Filtering Platform "Callout" that inspects traffic at various layers of the filtering platform, such as the FWPM_LAYER_ALE_AUTH_CONNECT_V4 and/or FWPM_LAYER_ALE_AUTH_CONNECT_V6 layer of the Windows® Filtering Platform. The VCS callout component can receive (or at least receive an indication of) outbound traffic, such as TCP/IP, UDP, etc. packets, optionally of particular type(s), such as TCP "SYN" packets, going through the networking stack, based on operation of a function that classifies and flags outgoing traffic. The VCS callout can have default behavior that initially blocks all such traffic and then queues it for deferred processing using a worker thread. Such a worker thread can prompt the VCS session component for a block/permit decision on each packet, and the either drop or re-inject each such packet based on the result.

The callout may be registered to one or more layers of the networking stack. Depending on the layer that the call out is registered-to, the OS firewall can indicate a corresponding set of metadata to the callout. A developer of the callout can sift through the provided metadata and use system APIs to identify, e.g. a user or user group associated with the network traffic being inspected, i.e. on behalf of which the network traffic is generated. Accordingly, the VCS callout component is able to associate a user, user group, and/or authentication domain to any given outbound network traffic packet based on metadata that is associated with the packet.

Referring again to FIG. 2, a userspace VCS Command Line Interface 240 is provided. The VCS command line interface 240 can provide a quick and easy way to control the VCS driver 224 via IOCTL commands 241 sent to the IOCTL dispatch component 242. In some examples, the command line interface is implemented with the standard C library, though additionally or alternatively a command line interface helper library may be implemented to build more complex controls. In some embodiments, a graphical user interface may be built to provide functionality of the command line interface.

The command line interface 240 includes the following components, in some examples:

VCS.c—The entry point into the command line interface. This component may also provide functions that print usage and help messages for the VCS.

ioctl.c—Helper function(s) that allow the VCS command line interface to communicate to the VCS driver via IOCTL. These function(s) may be factored into a data link library (.dll).

VCSControls.c—This component can define functions that send control messages to the VCS driver. While I/O control is a transport layer to communicate requests between userspace and the driver, the VCSControls may be an abstraction layer that gives developers an intuitive and powerful API to hide the underlying transport layer. If a new version of the OS on top of which aspects described herein are built and sheds IOCTLs leveraged by aspects described herein, a solution would be to replace the ioctic files (see above) with whatever the new OS transport mechanism is. The VCS controls would still provide the same internal API and functionality, the difference being that it uses a slightly different method to communicate to the kernel. Accordingly, the API can abstract an OS-provided transport layer to facilitate communicating configuration requests between userspace and the driver in kernel space to configure the filtering that is being performed.

VCSCmdParser.cpp—This component defines functions for parsing command line arguments passed to VCS.

A project of the IDE may create a Windows® (or other applicable OS) installer that can be used to install VCS aspects described herein. The project can use an installer tool, such as Inno Setup, to create an installer application for the operating system (e.g. Windows®). Additionally or alternatively, a VCS driver package project can be used to configure automatic deployments of the VCS driver from within the development environment (such as Visual Studio®).

Examples are now provided for using and configuring VCS rules and the VCS program. To use and configure VCS, in some examples, a command line interface (e.g. 240 of FIG. 2) is used to open a command prompt (e.g. with administrative rights). The user browses to the VCS installation directory to use the VCS command line interface.

VCS Commands:

The following describes example available VCS commands, some or all of which may be incorporated in a VCS offering described herein:

Command: block

Options/Flags: −u, −d, −ip, −p, −g

The 'block' command is used to block a specified user (indicated by the −u flag) or users of an authentication domain (indicated by the −d flag) from creating new outbound connections. The −ip flag can indicate blockage of traffic to a specified IP address, and the −p flag can indicate blockage of traffic to a specified port. The −g flag can indicate blockage of traffic for a specific user group. One or more such flags can be applied to create a filtering rule.

A TCP/IP SYN packet is the TCP's way of starting/creating a new connection/session. In some examples of aspects described herein, examination of TCP/IP packets (i.e. via the metadata indicating the user/group/domain on behalf of which the packet is generated, the destination IP and/or port) extends only to the TCP/IP SYN type of packets, and does not extend to one or more other types of TCP/IP packets, such as data packets exchanged during the TCP session. This can help minimize delays and avoid introducing additional latency waiting for VCS to perform filtering on multiple different types of traffic. By examining only the SYN type of TCP/IP packets, the filtering is performed against session creation. It may then be assumed that if VCS correctly blocks traffic at the session-creation phase, that there is no channel for exchanging further, disallowed communications between the endpoints.

Thus, in an embodiment described above, the filtering (blocking) examines only the SYN type of TCP/IP packets, optionally also examining all or some types of UDP traffic. However, filtering described herein—blocking and/or allowing described below of traffic—may additionally or alternatively be performed for other type(s) of traffic, such as ACK, TCP data packets and/or other types.

Command: allow

Options/Flags: −u, −d, −ip, −p, −g

The 'allow' command is analogous to the block command except that it creates an explicit allow of the specified user, user group, or users of the authentication domain to create new outbound connections. The −ip flag can indicate allowance of traffic to a specified IP address, the −p flag can indicate allowance of traffic to a specified port, and the −g flag can indicate allowance of traffic for specific user group. One or more such flags can be applied to create a filtering rule.

Conflicts in filter rules, such as where one rule explicitly allows the outbound traffic to pass and another rule explicitly blocks the outbound traffic from passing, can be resolved in any desired manner. For example, one action may take precedence over another with some default action applied.

Command: on

The 'on' command enables the configured VCS filtering rules. In some examples, the VCS filtering described herein is not activated until this command has been issued.

Command: off

The 'off' command disables the configured VCS filtering rules, effectively disabling any filtering applied in accordance with aspects described herein but not deleting the configured rules.

Command: debug

Options/flags: −all, −none

The 'debug' command is used to turn driver debug messages on and off, to be used for debugging purposes.

Further details are provided for using the −u, −g, −d, −ip and −p options with the allow or block commands. In some embodiments, use of either the −u, −g, or the −d option is required because it specifies the user(s)/user group(s)/domain(s) against which filtering is to apply.

−u <name> Specifies a username to apply a VCS rule to.
−g <name> Specifies a user group to apply a VCS rule to.
−d <name> Specifies an authentication domain to apply a VCS rule to.
−ip <address> Specifies a remote IP address for a VCS rule. A value 0.0.0.0 may be interpreted as "all" addresses.
−p <port> Specifies a remote port number for a VCS rule. In some examples, values between 0 and 65535 are acceptable, with a port value of 0 being interpreted as "all" ports.

USAGE EXAMPLES

The following present some examples of usage of the above commands in the creation of new VCS rules, in accordance with aspects described herein.

Example 1—Block a user "Vendor1" from creating any new outbound network connections: vcs block −u Vendor1

Example 2—Allow a user "Vendor1" to connect to a specific IP address and port: vcs allow −u Vendor1 −ip 192.168.1.1 −p 80. In this example, the allowed scope is 192.168.1.1:80, and some defaults, such as disallow, is applicable to all other traffic generated on behalf of Vendor1 for sending.

Example 3—Block all users who log in through the "Vendors" authentication domain from accessing a specific IP address: vcs block −d Vendors −ip 192.168.2.2.

Example 4: Turn VCS on to enable all configured rules: vcs on

Installation of VCS:

An OS-specific installer can be used to install VCS components on a machine. In some examples, the installer application runs with administrator privileges. An uninstall application may also be included with the OS-specific installer.

Described herein is a containment system networking utility effective to selectively block/filter outgoing network connections and traffic based on user attribute(s), such as username, authentication domain for users, and/or user group. This enables filtering on a per-user, user group, and/or per-domain basis, preventing a user or users from pivoting access from one system that to another system in a network.

Figure 3:
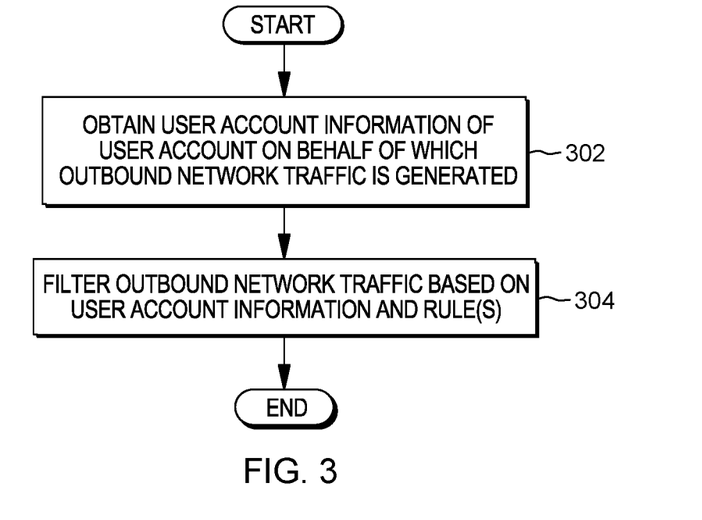
FIG. 3 depicts an example process for handling network traffic, in accordance with aspects described herein.

Accordingly, FIG. 3 depicts an example process for handling network traffic in accordance with aspects described herein. The processing begins by obtaining, in association with origination of outbound network traffic to be sent by a system, user account information of a user account on behalf of which outbound network traffic is generated (302). The obtained user account information may include an indication, such as a name, ID, or similar, of the user account. In some embodiments, the user is included in a user group for authenticating to the system, in which case the user account information may include an indication of the user group. In yet further examples, the user authenticates to the system by logging onto an authentication domain and the obtained user account information includes an indication, such as name, ID, or similar, of the authentication domain.

The process of FIG. 3 continues by performing filtering of the outbound network traffic based on the obtained user account information of the user account on behalf of which the outbound network traffic is generated (304). The filtering may be further based on one or more rules. Filtering the network traffic can include determining whether to block or allow sending of the outbound network traffic from the system, and can also include actually blocking—deleting, dropping, queuing, etc.—the network traffic or allowing the traffic, e.g. refraining from interfering with its egress or forwarding the traffic to the next component in the outbound path.

The filtering can include inspecting network traffic of the system to identify network traffic of one or more network traffic types that have been designated as subject to the filtering. Filtering of the outbound network traffic based on the indicated user account on behalf of which the outbound network traffic is generated can apply to those one or more network traffic types to the exclusion of others, e.g. where outbound network traffic of a network traffic type other than the one or more networking traffic types is not subject to the filtering. For instance, the one or more network traffic types can include TCP SYN packets and/or UDP packets. Filtering TCP SYN packets enables session control. Additionally or alternatively, the one or more network traffic types can include TCP data packets—those that are sent/received after the handshake and initial session control packets are exchanged.

The filtering is in some examples implemented by a driver added to a kernel of an operating system of the system. The driver can be built on top of a system-level application programming interface of the system, and can include a hook procedure for handling a hook installed into a networking stack of the system via the system level application programming interface.

As noted, the filtering is based on one or more rules. The filtering can check rule(s) to make filtering decisions, i.e. whether to block or allow. As an example, the filtering checks a rule, of the one or more rules, that specifies the user account and indicates whether sending of network traffic generated on behalf of the user account is to be blocked or is to be allowed for a particular scope applicable to the outbound network traffic. In some examples, the scope includes one or more destination address(es) or address range and/or port on which the communication takes place. As another example, the filtering checks a rule, of the one or more rules, that specifies the user group and indicates whether sending of network traffic generated on behalf of users included in the user group is to be blocked or is to be allowed for a particular scope applicable to the outbound network traffic. As yet another example, the filtering checks a rule, of the one or more rules, that specifies the authentication domain and indicates whether sending of network traffic generated on behalf of users authenticating to the system by logging onto the authentication domain is to be blocked or is to be allowed for a particular scope applicable to the outbound network traffic. Based on the checking, the filtering can determine whether to block or allow sending of the outbound network traffic.

The system to send the traffic may be part of an internal network. A client system external to the internal network may authenticate to the system using the user account. In a specific example, the outbound network traffic includes an attempt by the client system to access, by pivoting from the initial system to which the client system has access, another system that is part of the internal network, and the filtering prevents the attempt by the client system to access the another system. The filtering may be implemented on the initial system internal to the network.

To configure the filtering, an application programming interface may be provided that abstracts an operating system-provided transport layer. This can facilitate communicating configuration requests between software executing in userspace and the driver in kernel space.

Aspects described herein provide the ability to filter network traffic outbound from a system, such as a computer system. The filtering (e.g. described above with reference to FIG. 3) may be performed by software executing on a computer system, which may be the system from which the outbound networking traffic is being sent, which is in some examples the initial system that the client system accesses internal to the network. In other examples, the computer system implementing the filtering may be the client system itself, which might recognize that outgoing traffic is bound for an internal network component other than the initial system to which the client is given access.

Figure 4:
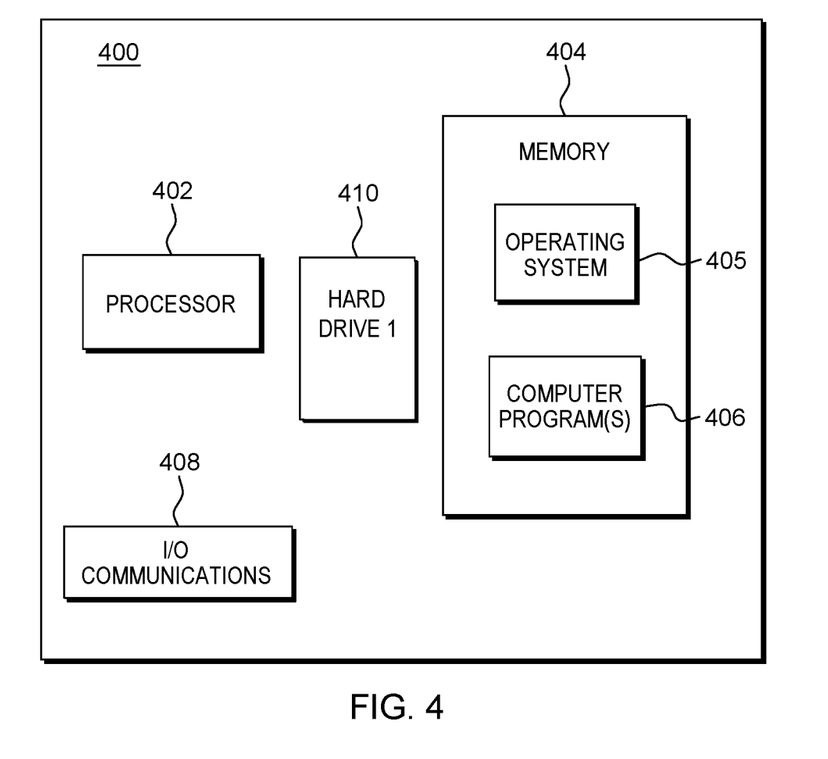
FIG. 4 depicts an example computer system to incorporate and/or use aspects described herein.

FIG. 4 depicts an example computer system to incorporate and/or use aspects described herein. Computer system 400 includes a processor 402 and memory 404. Processor 402 includes any appropriate hardware component(s) capable of executing one or more instructions from memory 404. Memory 404 includes an operating system 405 and computer program(s) 406 that are loaded from one or more hard drives 410.

Further, computer system 400 includes an input/output (I/O) communications interface component 408 for communicating data between computer system 400 and external devices, such as I/O and peripheral devices (mouse, keyboard, display, optical devices) and network devices, as examples.

In some embodiments, aspects described herein may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may comprise a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to comprise a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 5:
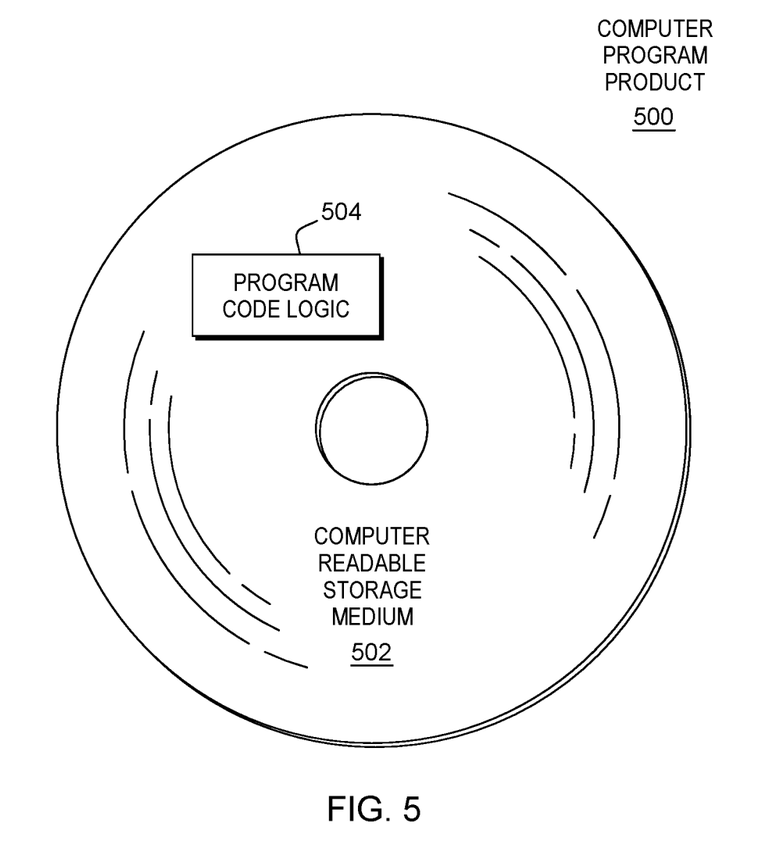
FIG. 5 depicts an embodiment of a computer program product incorporating aspects described herein.

Referring now to FIG. 5, in one example, a computer program product 500 includes, for instance, one or more computer readable media 502 to store computer readable program code means or logic 504 thereon to provide and facilitate one or more aspects of the present invention.

Program code contained or stored in/on a computer readable medium can be obtained and executed by a computer system (computer, computer system, etc. including a component thereof) and/or other devices to cause the computer system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more computer system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which comprises one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

responsive to a client authenticating to a computer system of an internal network, the client being outside the internal network and the authenticating providing the client access to the computer system of the internal network, and further responsive to activity, by the client on the computer system after authenticating to the computer system, causing generation of new outbound network traffic that originates on the computer system and is to be sent by the computer system to another component of the internal network, obtaining, in association with the generating, user account information of a user account on behalf of which the computer system generated the outbound network traffic, the user account being an account that the client uses to properly authenticate to the computer system, wherein the outbound network traffic comprises network packets generated by the computer system, wherein each network packet of the generated network packets has individual metadata associated therewith by the computer system as part of the generating, and the individual metadata comprises the user account information of that user account on behalf of which the network packet was generated, wherein the activity causing the generation of the outbound network traffic comprises interaction by the client with a user space application installed on the computer system, the user space application generating the outbound network traffic, and wherein the obtaining the user account information comprises calling one or more system application programming interfaces to identify the user account information and associate it with a network packet of the network packets;

installing a hook into a networking stack of the computer system via a system-level application programming interface; and performing filtering of the outbound network traffic based on the obtained user account information of the user account on behalf of which the outbound network traffic is generated, wherein the filtering is further based on one or more rules, and the filtering comprises blocking or allowing sending of the outbound network traffic from the computer system to the another component of the internal network, the blocking or allowing sending of the outbound network traffic comprising, for each network packet of the generated network packets, blocking or allowing sending of the network packet from the computer system to the another component based at least in part on the user account information of the metadata associated with the network packet, wherein a determination whether to block or allow sending of the network packet is made by comparing the identified user account information to the one or more rules, wherein the filtering is implemented by a driver added to a kernel of an operating system of the computer system, wherein the driver is built on top of the system-level application programming interface of the computer system, and wherein the driver comprises a hook procedure for handling the hook installed into the networking stack of the computer system via the system level application programming interface.

2. The method of claim 1, wherein the obtained user account information indicates the user account, and wherein the filtering comprises:
- checking a rule of the one or more rules, the rule specifying the user account and indicating whether sending of network traffic generated on behalf of the user account is to be blocked or is to be allowed for a particular scope applicable to the outbound network traffic; and
- determining, based on the checking, whether to block or allow sending of the outbound network traffic, the determining whether to block or allow sending of the outbound network traffic being on a packet-by-packet basis, based on the indication of the user account by the metadata associated with each respective network packet.

3. The method of claim 1, wherein the user is included in a user group for authenticating to an operating system of the computer system, wherein the obtained user account information indicates the user group, and wherein the filtering comprises:
- checking a rule of the one or more rules, the rule specifying the user group and indicating whether sending of network traffic generated on behalf of users included in the user group is to be blocked or is to be allowed for a particular scope applicable to the outbound network traffic; and
- determining, based on the checking, whether to block or allow sending of the outbound network traffic, the determining whether to block or allow sending of the outbound network traffic being on a packet-by-packet basis, based on the indication of the user group by the metadata associated with each respective network packet.

4. The method of claim 1, wherein the user authenticates to the computer system by logging onto an operating system (OS) environment authentication domain, wherein the obtained user account information indicates the authentication domain, and wherein the filtering comprises:
- checking a rule of the one or more rules, the rule specifying the authentication domain and indicating whether sending of network traffic generated on behalf of users authenticating to the computer system by logging onto the authentication domain is to be blocked or is to be allowed for a particular scope applicable to the outbound network traffic; and
- determining, based on the checking, whether to block or allow sending of the outbound network traffic, the determining whether to block or allow sending of the outbound network traffic being on a packet-by-packet basis, based on the indication of the authentication domain by the metadata associated with each respective network packet.

5. The method of claim 1, wherein a client system external to the internal network authenticates to the computer system using the user account, wherein the outbound network traffic comprises an attempted access of the another system, and wherein the filtering prevents the attempted access the another system.

6. The method of claim 1, wherein the application programming interface that-abstracts an operating system-provided transport layer to facilitate communicating configuration requests between userspace and the driver in kernel space to configure the filtering.

7. The method of claim 1, wherein the filtering comprises inspecting the network packets to identify one or more network traffic types, wherein the filtering of the outbound network traffic based on the obtained user account information applies to the one or more network traffic types, wherein network packets of a network traffic type other than the one or more networking traffic types are not subject to the filtering.

8. The method of claim 7, wherein the one or more network traffic types comprises Transmission Control Protocol (TCP) packets or User Datagram Protocol (UDP) packets.

9. The method of claim 1, wherein a firewall of an operating system of the computer system indicates to a callout component the metadata associated with a network packet of the network packets.

10. The method of claim 1, wherein the network packets comprise TCP/IP packets, and wherein the user account is an operating system-level user account with which the client properly authenticates to an operating system of the computer system using credentials of the operating system-level user account.

11. A computer program product comprising:
- a non-transitory computer-readable storage medium comprising program instructions for execution to perform a method comprising:
  - responsive to a client authenticating to a computer system of an internal network, the client being outside the internal network and the authenticating providing the client access to the computer system of the internal network, and further responsive to activity, by the client on the computer system after authenticating to the computer system, causing generation of new outbound network traffic that originates on the computer system and is to be sent by the computer system to another component of the internal network, obtaining, in association with the generating, user account information of a user account on behalf of which the computer system generated the outbound network traffic, the user account being an account that the client uses to properly authenticate to the computer system, wherein the outbound network traffic comprises network packets generated by the computer system, wherein each network packet of the generated network packets has individual metadata associated therewith by the computer system as part of the generating and the individual metadata comprises the user account information of that user account on behalf of which the network packet was generated, wherein the activity causing the generation of the outbound network traffic comprises interaction by the client with a user space application installed on the computer system, the user space application generating the outbound network traffic, and wherein the obtaining the user account information comprises calling one or more system application programming interfaces to identify the user account information and associate it with a network packet of the network packets; and
  - installing a hook into a networking stack of the computer system via a system-level application programming interface; and
  - performing filtering of the outbound network traffic based on the obtained user account information of the user account on behalf of which the outbound network traffic is generated, wherein the filtering is further based on one or more rules, and the filtering comprises blocking or allowing sending of the outbound network traffic from the computer system to the another component of the internal network, the blocking or allowing sending of the outbound network traffic comprising, for each network packet of the generated network packets, blocking or allowing sending of the network packet from the computer system to the another component based at least in part on the user account information of the metadata associated with the network packet, wherein a determination whether to block or allow sending of the network packet is made by comparing the identified user account information to the one or more rules, wherein the filtering is implemented by a driver added to a kernel of an operating system of the computer system, wherein the driver is built on top of the system-level application programming interface of the computer system, and wherein the driver comprises a hook procedure for handling the hook installed into the networking stack of the computer system via the system level application programming interface.

12. The computer program product of claim 11, wherein the obtained user account information indicates the user account, and wherein the filtering comprises:
  checking a rule of the one or more rules, the rule specifying the user account and indicating whether sending of network traffic generated on behalf of the user account is to be blocked or is to be allowed for a particular scope applicable to the outbound network traffic; and
  determining, based on the checking, whether to block or allow sending of the outbound network traffic, the determining whether to block or allow sending of the outbound network traffic being on a packet-by-packet basis, based on the indication of the user account by the metadata associated with each respective network packet.

13. The computer program product of claim 11, wherein the user is included in a user group for authenticating to an operating system of the computer system, wherein the obtained user account information indicates the user group, and wherein the filtering comprises:
  checking a rule of the one or more rules, the rule specifying the user group and indicating whether sending of network traffic generated on behalf of users included in the user group is to be blocked or is to be allowed for a particular scope applicable to the outbound network traffic; and
  determining, based on the checking, whether to block or allow sending of the outbound network traffic, the determining whether to block or allow sending of the outbound network traffic being on a packet-by-packet basis, based on the indication of the user group by the metadata associated with each respective network packet.

14. The computer program product of claim 11, wherein the user authenticates to the computer system by logging onto an operating system (OS) environment authentication domain, wherein the obtained user account information indicates the authentication domain, and wherein the filtering comprises:
  checking a rule of the one or more rules, the rule specifying the authentication domain and indicating whether sending of network traffic generated on behalf of users authenticating to the computer system by logging onto the authentication domain is to be blocked or is to be allowed for a particular scope applicable to the outbound network traffic; and
  determining, based on the checking, whether to block or allow sending of the outbound network traffic, the determining whether to block or allow sending of the outbound network traffic being on a packet-by-packet basis, based on the indication of the authentication domain by the metadata associated with each respective network packet.

15. A computer system comprising:
a memory; and
a processing circuit in communication with the memory, wherein the computer system is configured to perform a method comprising:
  responsive to a client authenticating to a computer system of an internal network, the client being outside the internal network and the authenticating providing the client access to the computer system of the internal network, and further responsive to activity, by the client on the computer system after authenticating to the computer system, causing generation of new outbound network traffic that originates on the computer system and is to be sent by the computer system to another component of the internal network, obtaining, in association with the generating, user account information of a user account on behalf of which the computer system generated the outbound network traffic, the user account being an account that the client uses to properly authenticate to the computer system, wherein the outbound network traffic comprises network packets generated by the computer system, wherein each network packet of the generated network packets has individual metadata associated therewith by the computer system as part of the generating and the individual metadata comprises the user account information of that user account on behalf of which the network packet was generated, wherein the activity causing the generation of the outbound network traffic comprises interaction by the client with a user space application installed on the computer system, the user space application generating the outbound network traffic, and wherein the obtaining the user account information comprises calling one or more system application programming interfaces to identify the user account information and associate it with a network packet of the network packets;
  installing a hook into a networking stack of the computer system via a system-level application programming interface; and
  performing filtering of the outbound network traffic based on the obtained user account information of the user account on behalf of which the outbound network traffic is generated, wherein the filtering is further based on one or more rules, and the filtering comprises blocking or allowing sending of the outbound network traffic from the computer system to the another component of the internal network, the blocking or allowing sending of the outbound network traffic comprising, for each network packet of the generated network packets, blocking or allowing sending of the network packet from the computer system to the another component based at least in part on the user account information of the metadata associated with the network packet, wherein a determination whether to block or allow sending of the network packet is made by comparing the identified user account information to the one or more rules, wherein the filtering is implemented by a driver added to a kernel of an operating system of the computer system, wherein the driver is built on top of the system-level application programming interface of the computer system, and wherein the driver comprises a hook procedure for handling the hook installed into the networking stack of the computer system via the system level application programming interface.

16. The computer system of claim 15, wherein the obtained user account information indicates the user account, and wherein the filtering comprises:

checking a rule of the one or more rules, the rule specifying the user account and indicating whether sending of network traffic generated on behalf of the user account is to be blocked or is to be allowed for a particular scope applicable to the outbound network traffic; and determining, based on the checking, whether to block or allow sending of the outbound network traffic, the determining whether to block or allow sending of the outbound network traffic being on a packet-by-packet basis, based on the indication of the user account by the metadata associated with each respective network packet.

17. The computer system of claim 15, wherein the user is included in a user group for authenticating to an operating system of the computer system, wherein the obtained user account information indicates the user group, and wherein the filtering comprises:

checking a rule of the one or more rules, the rule specifying the user group and indicating whether sending of network traffic generated on behalf of users included in the user group is to be blocked or is to be allowed for a particular scope applicable to the outbound network traffic; and determining, based on the checking, whether to block or allow sending of the outbound network traffic, the determining whether to block or allow sending of the outbound network traffic being on a packet-by-packet basis, based on the indication of the user group by the metadata associated with each respective network packet.

18. The computer system of claim 15, wherein the user authenticates to the system by logging onto an operating system (OS) environment authentication domain, wherein the obtained user account information indicates the authentication domain, and wherein the filtering comprises:

checking a rule of the one or more rules, the rule specifying the authentication domain and indicating whether sending of network traffic generated on behalf of users authenticating to the computer system by logging onto the authentication domain is to be blocked or is to be allowed for a particular scope applicable to the outbound network traffic; and determining, based on the checking, whether to block or allow sending of the outbound network traffic, the determining whether to block or allow sending of the outbound network traffic being on a packet-by-packet basis, based on the indication of the authentication domain by the metadata associated with each respective network packet.

* * * * *